Figure 1:
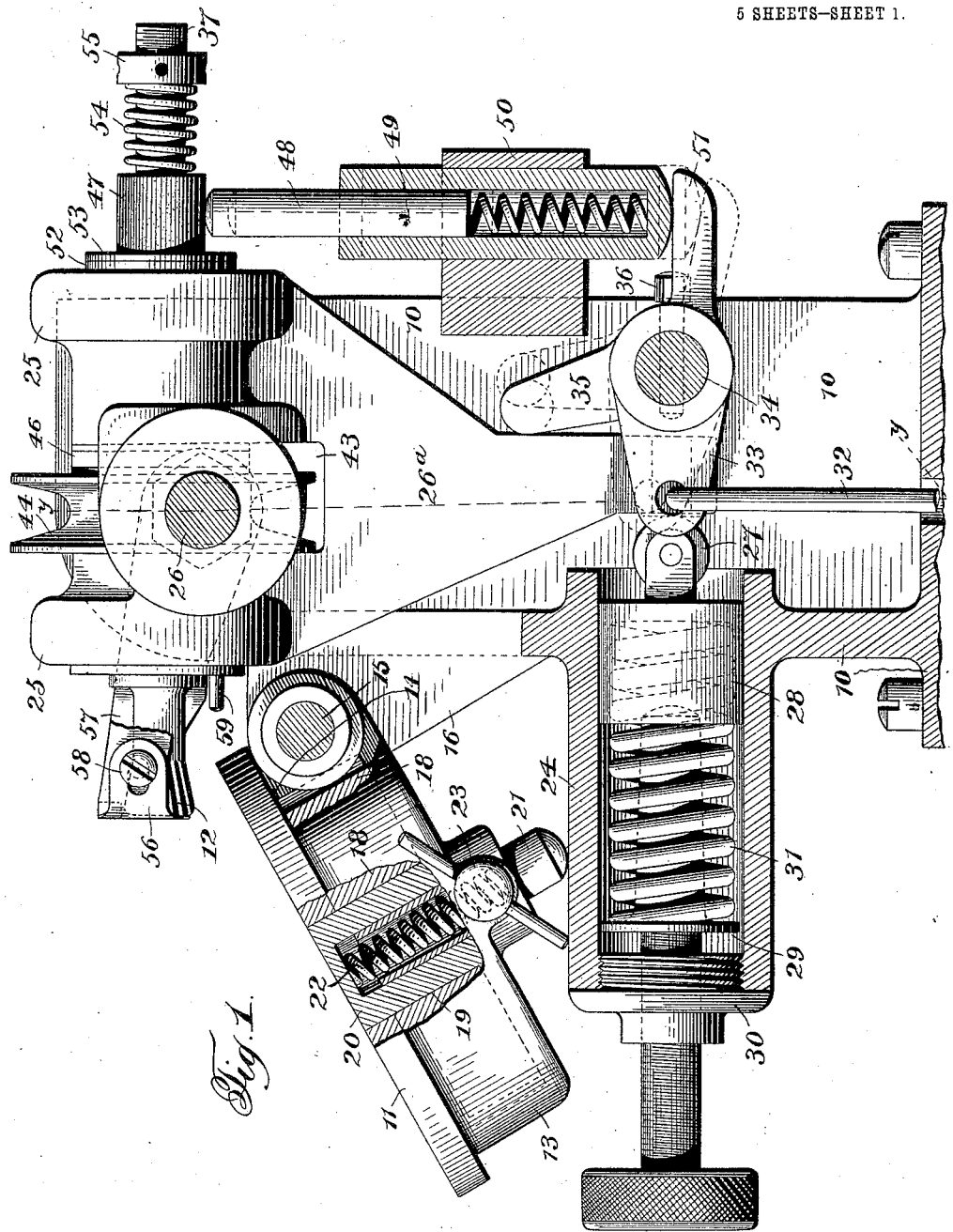

L. W. G. FLYNT.
ECCENTRIC WHEELER.
APPLICATION FILED JULY 7, 1906.

1,030,576.

Patented June 25, 1912.

5 SHEETS—SHEET 1.

Witnesses:
Jas. E. Hutchinson
Miller F. Rowe

Inventor:
Louis W. G. Flynt,
By Macomilans Attorneys.

L. W. G. FLYNT.
ECCENTRIC WHEELER.
APPLICATION FILED JULY 7, 1906.
1,030,576.
Patented June 25, 1912.
5 SHEETS—SHEET 2.
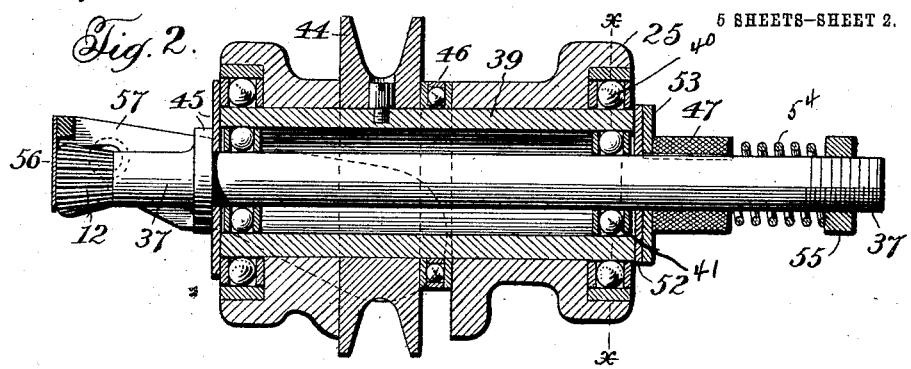
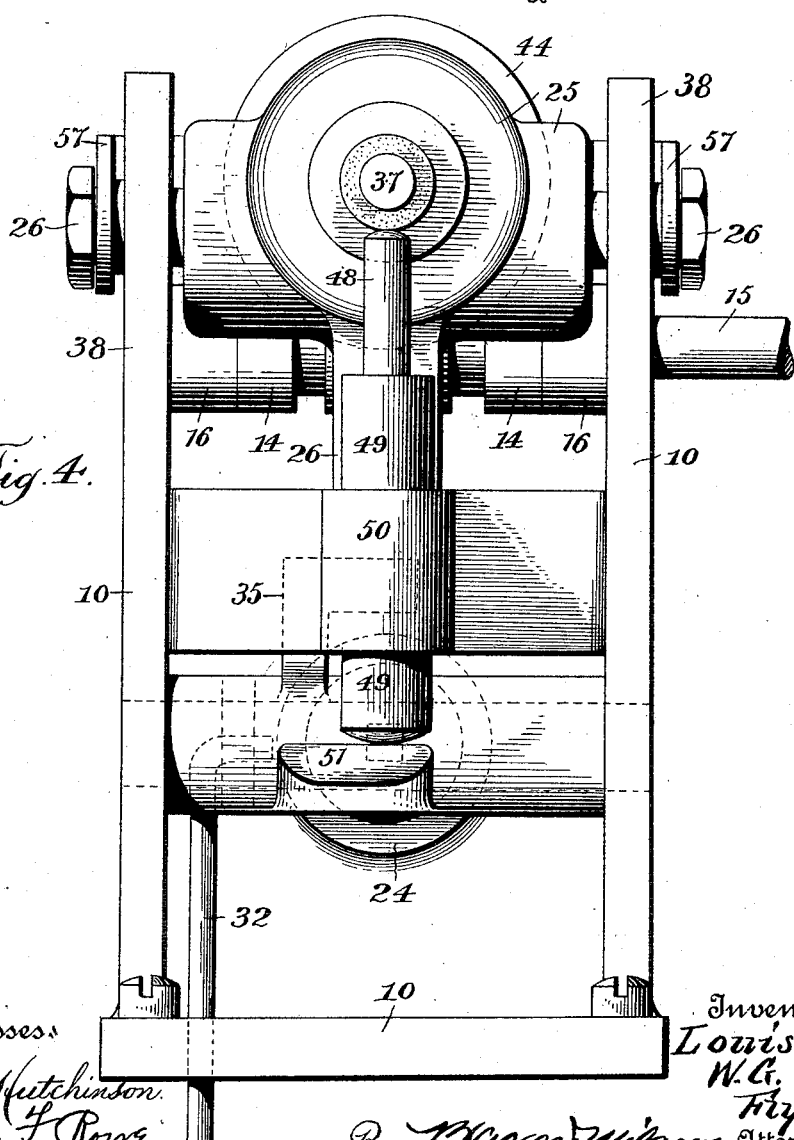

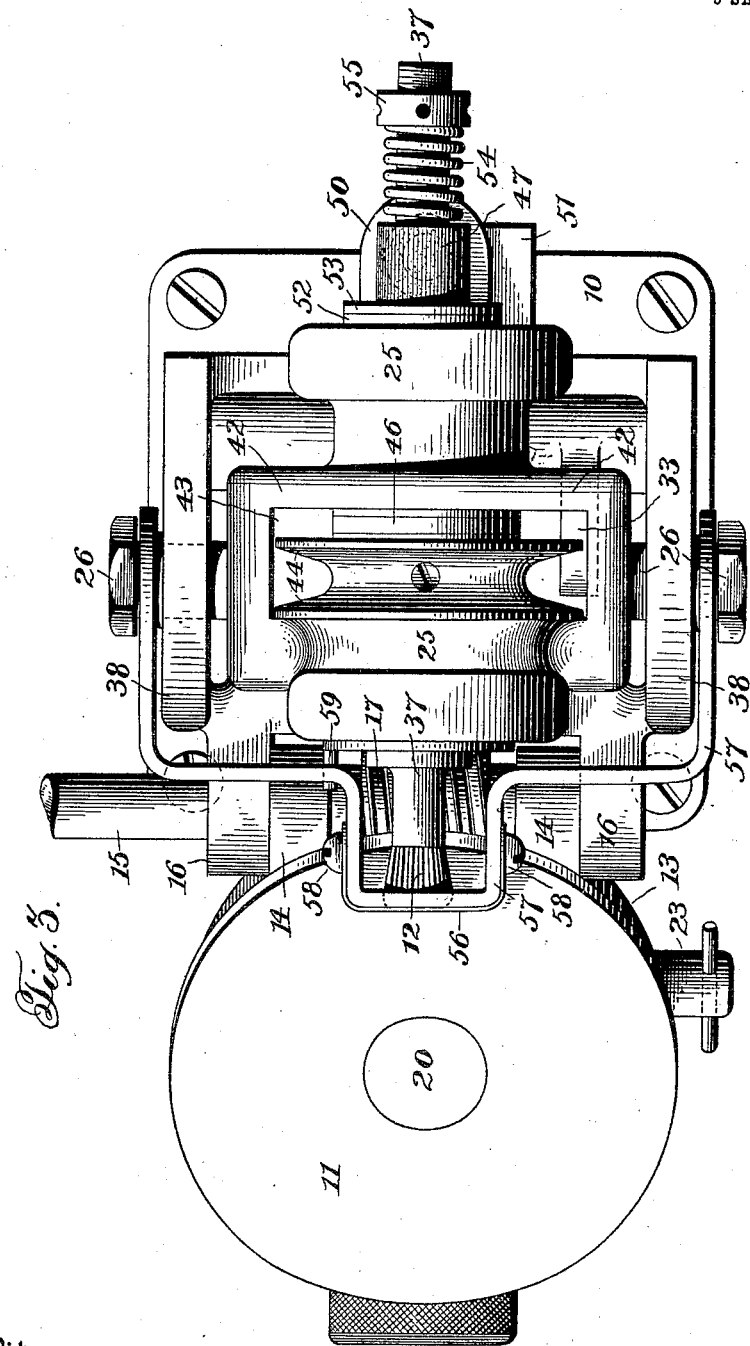

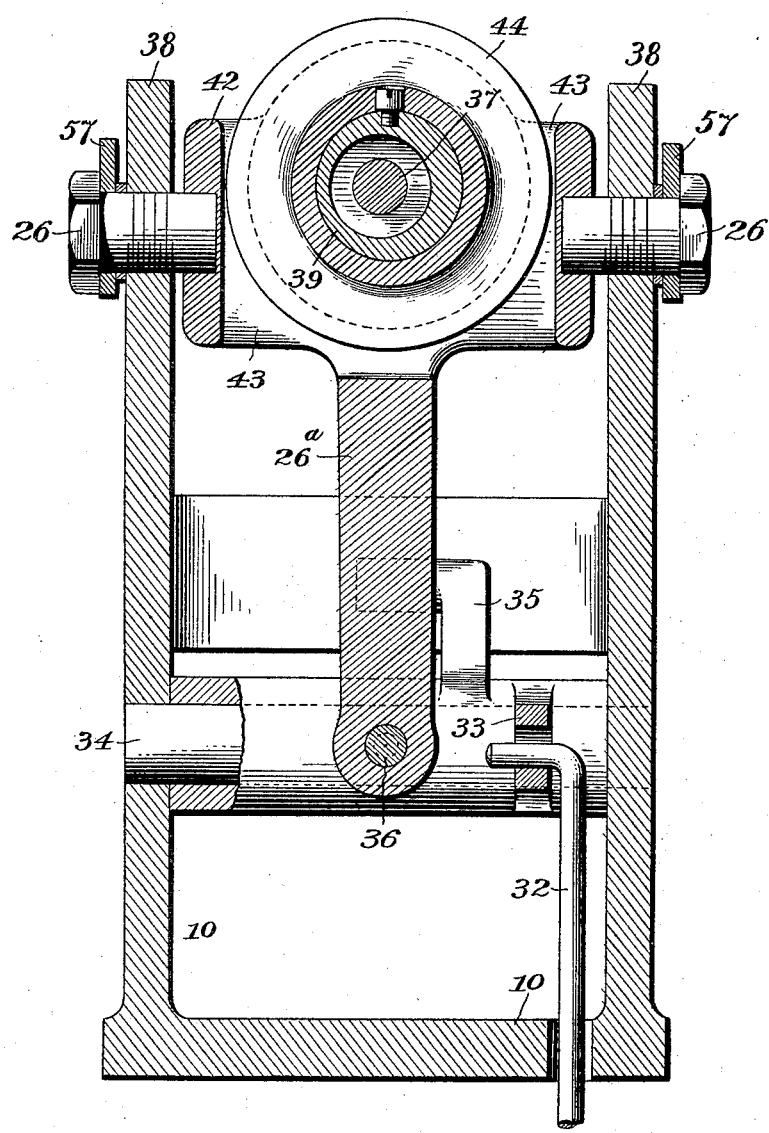

L. W. G. FLYNT.
ECCENTRIC WHEELER.
APPLICATION FILED JULY 7, 1906.

1,030,576.

Patented June 25, 1912.

5 SHEETS—SHEET 5.

Witnesses:
Jas. E. Hutchinson
Nellie F. Rowe

Inventor:
Louis W. G. Flynt,
By McMillans Attorneys

COLUMBIA PLANOGRAPH CO., WASHINGTON, D. C.

UNITED STATES PATENT OFFICE.

LOUIS W. G. FLYNT, OF ROCHESTER, NEW YORK, ASSIGNOR, BY MESNE ASSIGNMENTS, TO UNITED SHOE MACHINERY COMPANY, OF PATERSON, NEW JERSEY, A CORPORATION OF NEW JERSEY.

ECCENTRIC WHEELER.

1,030,576.      Specification of Letters Patent.      Patented June 25, 1912.

Application filed July 7, 1906. Serial No. 325,095.

*To all whom it may concern:*

Be it known that I, LOUIS W. G. FLYNT, a subject of Great Britain, residing at Rochester, in the county of Monroe and State of New York, have invented certain new and useful Improvements in Eccentric Wheelers, of which the following is a specification, reference being had therein to the accompanying drawing.

This invention relates to machines for forming indentations or stitch impressions on the extended edges of shoe soles and is particularly applicable to sole indenting machines in which the indenting tool consists of a wheel provided with teeth shaped and spaced to produce the desired form of indentation.

While the present invention is particularly applicable to sole indenting machines comprising an indenting wheel, which machines are commonly known in the art as "wheeling" or "stitch wheeling machines," certain features of the invention may also be embodied in other types of sole indenting machines.

One of the objects of the present invention is to provide a simple, compact and durable mechanism for bodily moving over the work the tool of a sole indenting machine and more particularly the indenting wheel of a stitch wheeling machine.

Another object of the invention is to improve the manner in which the tool of a sole indenting machine is actuated to form indentations, so that the indentations can be formed in the work with less pressure than has heretofore been required and with less tendency to distort the material being operated upon.

Another object of the present invention is to provide an improved construction and arrangement of parts in a stitch wheeling machine whereby the indenting wheel can be utilized to assist in feeding the work and at the same time can be rotated by the engagement of the work therewith.

With the above objects in view a feature of the present invention consists in the means hereinafter described and claimed for moving the tool of a sole indenting machine bodily back and forth over the work.

Another feature of the present invention contemplates imparting to an indenting tool while in contact with the work, a rocking movement longitudinally of its work engaging face or edge.

Another feature of the present invention contemplates the provision in a stitch wheeling machine provided with an indenting wheel mounted to be rotated by the engagement of the work therewith of means tending to rotate the wheel in the direction to feed the work.

In addition to the features above referred to the present invention also consists in certain constructions, and arrangements of parts hereinafter described and claimed, tending to simplify and improve the construction and mode of operation of sole indenting machines. The advantages of these constructions and arrangements will be obvious to those skilled in the art from the following description taken in connection with the accompanying drawings wherein is illustrated a sole indenting machine embodying the several features of the present invention in their preferred form.

It may be briefly stated that the construction shown comprises an indenting wheel and a spindle secured together to rotate simultaneously, the spindle being conveniently mounted eccentrically in a rotatable sleeve, which in turn is positioned in a carrier mounted on an axis extending at right angles to the axes of said wheel and sleeve. The special means which enables the indenting wheel to assist in feeding the work consists of means for creating more or less friction between such sleeve and spindle, as may be found necessary under the conditions governing the use of the machine. Owing to the eccentricity of the spindle with respect to the sleeve, the sleeve when rotated causes the wheel to travel a circular path when such a movement is not resisted by the introduction and engagement of the work with the tool, in which latter case the circular movement is converted into two alternating movements, one a movement of the carrier in a vertical direction, and the other a movement of the tool in a horizontal direction over the surface of the work. This conversion of movement also creates a rapid axial rocking of the tool to alternately change the operating plane of the engaging edge of the tool, and which rocking with respect to the work, is longitudinally of the indentations or stitch impressions.

Figure 6:
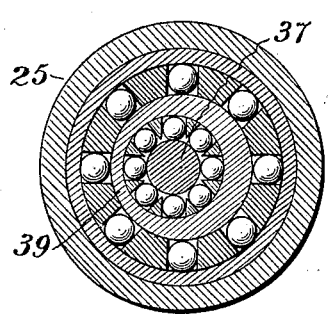
Figure 7:
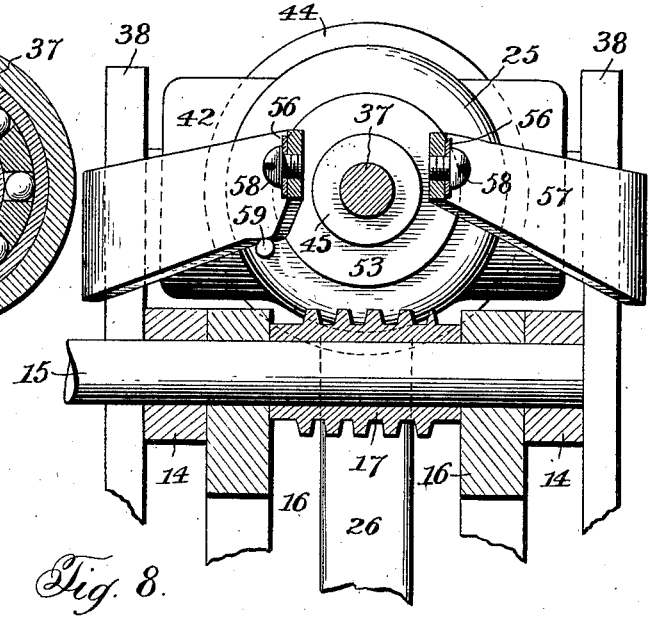
Figure 8:
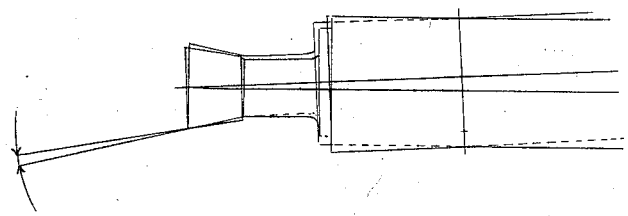
Figure 9:
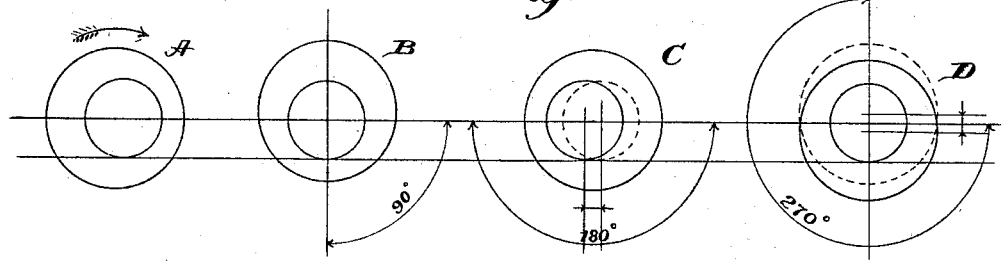

In the drawings, Figure 1 is a side elevation of the machine; parts being broken away to show interior devices; Fig. 2, is a longitudinal sectional view through the upper portion of Fig. 1; Fig. 3, is a top plan view of Fig. 1; Fig. 4, is a rear elevation; Fig. 5, is a transverse sectional view on the line y, y of Fig. 2; Fig. 6, is a similar sectional view on the line x, x of Fig. 1; Fig. 7 is a detail sectional view through the indenting wheel and shoe protector operatively associated therewith; Fig. 8 is a diagrammatic view showing the rocking movements of the tool; and Fig. 9 is a diagrammatic view showing the manner of reciprocating the tool across the surface of the work under the actuation of the sleeve within which the tool is eccentrically mounted and when an up and down movement of the tool is restrained by its engagement with the work.

Referring more specifically to the drawings wherein like reference characters designate corresponding parts in the several views, 10 designates the frame of the machine which may be of any convenient configuration designed to be supported upon an ordinary pedestal, not shown, 11 the table for supporting the work and 12 the ribbed or toothed indenting wheel.

13 is a cup-shaped casing constituting the support for the table 11, said casing having ears 14, sleeved upon a drive shaft 15, and interposed between ears 16 on the frame 10, through which latter the said drive shaft also passes, and in all of which ears the drive shaft is rotatable to feed the table 11 in a rotary direction through the medium of the means now to be specified.

17 is a worm rigid with the shaft 15 and arranged intermediate the ears 14 on the table support 13 and in position to project into the latter whereby to intermesh with a toothed rim or disk 18 depending from the bottom of the table 11, the center of the table and toothed rim or disk being formed with a hollow bearing 19 adapted to fit over a stub shaft 20 projecting upwardly from the base of the casing 13. Within the stub shaft 20 which is formed hollow for that purpose I insert a spring-pressed plunger 21, the spring being represented at 22 as interposed between the plunger and the upper closed end of said shaft to exert a constant pressure to force the plunger outwardly when the latter is not held against such movement. A T-headed clamping bolt 23 passing through the casing 13 and adapted to impinge upon the plunger 21 is afforded to lock said plunger in adjusted position. The lower end of the plunger is designed to rest upon a fixed portion of the frame 10 of the machine, in this instance a tubular projection 24 extending forwardly therefrom and which will hereafter be further referred to, to support the rotatable table in different positions of angular adjustment on the shaft 15. In securing this adjustment it will be obvious that it is simply necessary to loosen the clamping bolt 23 and raise or lower the table and its support to the point desired, the spring pressed plunger 21 automatically adjusting itself to the distance between the same and the tubular projection 24, when upon turning the clamping bolt 23, into impingement with the plunger, the parts will be maintained in the adjusted position. The indenting wheel 12 is mounted whereby to occupy an operating position immediately above and adjoining the inner edge of the table 11.

25 represents the tool carrier which will be more specifically defined hereinafter, mounted to oscillate upon the pivots 26 whereby to shift the tool toward or from the work table, and 26ª is a depending extension rigid with said carrier against which a roller 27 on the inner end of a spring-pressed plunger 28 bears to force the indenting wheel 12 into engagement with the work under whatever pressure may be determined, an adjustable abutment 29 threaded through the cap 30 on the tubular extension 24 and bearing against the spring 31 serving as a means to adjust such pressure. It is to be observed that the tubular extension constitutes a housing for the spring as also a guide within which the plunger 28 slides or reciprocates back and forth.

A link 32 connecting at its lower end with any suitable treadle mechanism (not shown) and at its upper end with an arm 33 on the rock shaft 34 is provided to force another arm 35 on said rock shaft against the extension 26ª and in opposition to the spring-pressed plunger 28, to oscillate the carrier 25 in a reverse direction and elevate the indenting wheel away from the work. An adjustable screw bolt 36 passing through the shaft 34 forms a stop in the path of movement of the extension 26ª under the pressure of the spring-pressed plunger 28, to limit the oscillation of the carrier 25 whereby to prevent the indenting wheel 12 from contacting with the rotatable table 11.

The means for effecting the horizontal movement or travel of the indenting wheel across the work will now be considered. 37 is the tool spindle or shaft which passes entirely through the oscillating carrier 25 whereby the pivots 26 which engage suitable bearing lugs 38 on the frame 10 are disposed at right angles to the axis of said spindle as also at right angles to the axis of the tool operating means as will presently appear. Within the carrier 25 and interposed between the same and the spindle 37 is a sleeve 39, ball bearings 40 being provided between the outer surface of said sleeve and the inner surface of the carrier at each end of the latter, and similar bearings 41 being interposed between the inner surface of the sleeve and the outer surface of the spindle whereby friction between the spindle and sleeve is substantially eliminated. The exact position of the spindle 37 within the sleeve 39 is slightly eccentric of said sleeve, the degree of eccentricity being of course one half the extent of the predetermined reciprocation or lateral shifting of the tool.

The oscillating carrier 25 is formed into a yoke 42 at its central portion to provide an open space 43 for the reception of a drive pulley 44 secured to the sleeve 39. When the sleeve 39 is rotated under the actuation of this pulley 44, through the medium of any suitable source of power, and there being no work interposed between the indenting wheel 12, and the table 11, said indenting tool and its spindle 37 will be caused to travel a circular path, the diameter of which is equal to twice the eccentricity of the axis of the spindle in the sleeve. When, however, work is interposed between the indenting wheel and the table 11 and the wheel is in forced engagement with the work by the pressure of the spring 31, under which conditions any tendency of the indenting wheel to move vertically is restrained, the movement of the tool and spindle is converted from the circular path into a substantially true horizontal movement of the spindle and tool and vertical movement of the carrier 25 on its pivots 26. This conversion of movement enables the maintenance of a constant engagement of the indenting tool with the work under unvarying pressure of the spring 31 and causes the tool to roll back and forth over the work. It is further to be noted that as an incident to the rapid conversion of the circular travel of the tool and spindle into the movements just recited, the tool and spindle (see Fig. 8) is given a rapid rocking movement longitudinally of the engaging edge of the tool and indentations formed thereby, which is highly advantageous in that it enables the desired results to be obtained with much less pressure than would otherwise be required, and consequently with correspondingly less distortion of the shoe or other work being operated upon. The cycle of movements of the tool when in engagement with the work under the pressure of the spring 31 is illustrated in Fig. 9, in which A shows the sleeve and the wheel with their centers on a horizontal line, the wheel to the right; B shows their relative positions after revolving the sleeve 90 degrees in the direction of the arrow, their centers now coinciding on a vertical line and the wheel having moved along on the surface of the work a distance equal to its eccentricity to the sleeve, the sleeve having raised an equal amount; C shows the result of a further rotation of 90 degrees, making 180 degrees from the first position, the wheel having traveled over the work a distance equal to twice the amount of its eccentricity to the sleeve which has assumed its original position with the center lines of the wheel and the sleeve both on the horizontal line; and D shows the position due to a further rotation of 90 degrees, making 270 degrees in all, and where the centers again coincide on a vertical line but the sleeve has fallen a distance equal to the eccentricity of the wheel in relation to the sleeve. C shows the extreme of the horizontal movement of the wheel and D the extreme of the vertical movement of the sleeve. Thrust bearings 45 and 46 are provided for the end thrust of the spindle 37.

From the foregoing it will be appreciated that the indenting wheel is provided with a very long and durable bearing; that the ball bearings enable the free rotation of such spindle under a minimum amount of friction; and that the operating means and bearings for the wheel and its spindle being approximately concentric therewith, the parts are well balanced and enable satisfactory operation at exceedingly high speed.

It is desirable that when the indenting wheel is elevated away from the work, and the work withdrawn, the movement of the tool and spindle be immediately stopped, and for that purpose I secure upon the spindle 37 a fiber collar 47, slidably mounted thereon but held against independent rotary movement, adapted to be engaged by the upper end of a spring-pressed plunger 48 mounted within a sleeve 49 slidable vertically through a hollow bracket 50 on the frame 10 and resting at its bottom or closed end upon a third arm 51 on the rock shaft 34. These parts are so arranged that when the spring-pressed plunger 28 is operating against the extension 26$^a$ of the oscillating carrier 25 and holding the indenting tool in engagement with the work the arm 51 occupies its lowermost position indicated by dotted lines in Fig. 1, with the plunger 48 and sleeve 49 dropped by force of gravity and resting on said arm. When, however, the link 32 is drawn downwardly and the arm 33 on the rock shaft 34 actuated to throw the second arm 35 against the extension 26$^a$ to rock the carrier 25 in the reverse direction and elevate the tool 12, from engagement with the work, the third arm 51 will be simultaneously elevated and through the medium of the slidable sleeve 49 will yieldably press the plunger 48 into surface engagement with the fiber collar 47 and effect an immediate stoppage of movement of the tool.

Under some conditions it is expedient that the actuation of the indenting tool be such as to coöperate with the positively driven table to feed the work therebetween, and to that end I provide means to create friction between the spindle 37 and the sleeve 39 whereby the former will tend to rotate under the actuation of the latter with sufficient force to substantially assist in feeding the work. I have shown in the drawing one means for accomplishing this end, the same comprising a friction washer 52, loose on the spindle 37 and interposed between the end of the eccentric sleeve 39 and a steel washer 53 which is free to slide along the spindle 37 but is held against rotation thereon.

54 is a spring bearing at one end against the fiber collar 47 heretofore described and at its opposite end against an adjusting nut 55 having threaded engagement with the spindle 37, the function of said spring being to force the fiber collar into engagement with the washer 53 and the latter in turn into engagement with the washer 52, whereby such friction as desired, depending upon the adjustment of the nut 55, is created between the spindle 37 and sleeve 39.

56 represents a guard arranged to cover the front of the wheel to protect the shoe from injury, said guard being preferably formed of thin sheet metal secured to a vertically adjustable yoke 57 through the medium of screws 58. This yoke is pivoted upon the trunnions 26 which carry the oscillating carrier 25, and may drop down into operating position either under force of gravity alone, or under the pressure of a light spring, (not shown). When the indenting wheel is elevated, the guard just referred to is correspondingly raised by a pin 59 projecting forwardly from the oscillating carrier 25.

The machine, by virtue of the rapid movements of the tool in two different directions, when the material is being acted on, results in producing a finished sole of marked regularity and evenness, while at the same time the vibrations of the machine are practically rendered *nil*.

I claim:

1. The combination with a tool formed to indent the edges of soles of shoes, of means for supporting and driving the same whereby the tool will be shifted laterally in a predetermined plane including a support within which the tool is eccentrically mounted, said support being held against movement in said lateral direction.

2. In combination with a pivoted support, a tool formed for the treatment of soles of shoes eccentrically mounted in said support, and means for driving the tool.

3. In combination with a tool formed for the treatment of soles of shoes, driving means for said tool surrounding the same and within which the tool is eccentrically mounted.

4. In combination with a tool formed for the treatment of soles of shoes, a carrier therefor within which the tool is eccentrically mounted, and operating means for the tool including a sleeve interposed between said carrier and the tool, and anti-friction bearings between the tool and sleeve and between the sleeve and carrier.

5. In combination with a tool formed for the treatment of soles of shoes, a carrier therefor within which the tool is eccentrically mounted, and operating means for the tool including a sleeve interposed between said carrier and the tool, and anti-friction bearings between the tool and sleeve and between the sleeve and carrier, in combination with means for pivoting said carrier on an axis transverse to the axis of said tool.

6. In combination with a tool formed for the treatment of soles of shoes, a carrier therefor within which the tool is eccentrically mounted, operating means for the tool including a sleeve interposed between said carrier and the tool, in combination with means for pivoting said carrier on an axis transverse to the axis of said tool.

7. In combination with a tool formed for the treatment of soles of shoes, a carrier therefor within which the tool is eccentrically mounted, operating means for the tool including a sleeve interposed between said carrier and the tool, in combination with means for pivoting said carrier on an axis transverse to the axis of said tool, and means for forcing the tool into engagement with the work.

8. In combination with a tool formed to indent the edges of soles of shoes, rotatable operating means therefor having a part of the tool extending thereinto, the axis of said part being arranged eccentrically with respect to said operating means, and instrumentalities independent of said tool for effecting the actuation of said means.

9. In combination with a tool formed for the treatment of soles of shoes, rotatable operating means therefor, the axis of the tool being arranged eccentrically with respect to said operating means, in combination with a support for said tool and operating means pivoted on an axis transverse to the axis of the tool.

10. In a machine of the character described, a tool formed to engage the surface of the projecting edge of a shoe sole and to indent said surface, means for shifting the tool laterally over the edge of the shoe and for rocking the tool lengthwise of its indenting edge.

11. In a machine of the character described, a tool formed for making stitch-imitative indentations in shoe soles, and means for shifting the tool laterally and for rocking the same independently of its engagement with the work longitudinally of its engaging edge, in combination with means for maintaining the tool in constant engagement with the work.

12. In a machine of the character described, a toothed wheeling tool formed for the treatment of soles of shoes, means for shifting the tool laterally whereby it may rotate upon the work and for rocking the same longitudinally of its engaging edge.

13. In a machine of the character described, a tool formed for the treatment of soles of shoes, a carrier within which the tool is free to rotate, operating means to impart lateral movement to the tool, and means for creating friction between said operating means and the tool whereby the tool may assist in feeding the work engaged thereby.

14. In a machine of the character described, a tool formed for the treatment of soles of shoes, a carrier within which the tool is eccentrically mounted and free to rotate, operating means to impart lateral movement to the tool including a sleeve intermediate the tool and carrier, and adjustable means for creating friction between said operating means and the tool whereby the tool may assist in feeding the work engaged thereby.

15. In a machine of the character described, a tool, a pivoted carrier therefor, said carrier having an extension, a spring pressed plunger bearing against one side of said extension to hold the tool in engagement with the work, and means adapted to engage the opposite side of said extension to shift the carrier against the pressure of the plunger to disengage the tool from the work, said means including an arm adapted to engage said extension, a shaft for said arm, and means operatively associated with said shaft for shifting the arm toward and from said extension, in combination with a brake for said tool, and means operatively associated with said shaft whereby the brake is applied simultaneously with the disengagement of the tool from the work.

16. In a machine of the character described, a freely rotating tool, means for shifting the tool into and out of engagement with the work, means for shifting the tool back and forth over the work and whereby the tool rotates, and means operable independently of said last mentioned means for stopping rotation of the tool when the same is shifted away from the work.

17. In a machine of the character described, a tool formed for the treatment of soles of shoes, driving means therefor surrounding the same and within which the tool is eccentrically mounted, said means effecting a shifting of the tool back and forth over the work and whereby the tool is rotated, and a brake operable independently of said driving means for stopping the rotation of the tool upon disengagement of the work therefrom.

18. In a machine of the character described, a rotary indenting tool formed to impress the edges of shoe soles, means for driving said tool, and a brake for said tool operable independently of said driving means, including a plunger arranged to contact a rotating part of said tool, a casing for said plunger, a spring in the casing abutting a part thereof at one end and at its other end engaging the plunger, and means for shifting said casing to compress the spring and yieldably force the plunger into braking engagement with the tool.

19. In a machine of the character described, a tool, a pivoted carrier therefor, a guard at the end of said tool supported from the pivots of the carrier, means for maintaining the tool in engagement with the work, and instrumentalities whereby the tool and guard are simultaneously withdrawn out of engagement with the work.

20. In a machine of the character described, a tool for treating leather, and means for imparting to the tool while in contact with the work rapid movements transversely across the face of the work and a positive rapid automatically varying contacting movement in a direction and to a predetermined extent at an angle to said other movement without bodily shifting the tool in a longitudinal direction.

21. In a machine for treating the soles of shoes, the combination with a tool, of means for moving the tool transversely and for automatically varying its contact with the work, a table for the work, and means for positively feeding the table.

22. In a machine of the character described, a tool formed for the treatment of the soles of shoes, means for shifting the tool laterally while rocking the same longitudinally of its engaging edge, a table, and means for positively feeding the table.

23. In a machine of the character described, a tool formed for the treatment of soles of shoes, means for shifting the tool laterally and for automatically varying its contact longitudinally of its engaging edge, a table for the work, and means for maintaining engagement of the table and tool with the work.

24. In a machine of the character described, a tool formed for the treatment of soles of shoes, means for shifting the tool laterally and for automatically varying its contact longitudinally of its engaging edge, a table for the work, and means for maintaining engagement of the table and tool with the work, in combination with means for positively feeding the table.

25. In a machine of the character described, a rotatable tool formed for the treatment of soles of shoes, means for shifting the tool laterally and for automatically varying its contact longitudinally of its engaging edge, a table for the work, and means for maintaining engagement of the table and tool with the work.

26. In a machine of the character described, a rotatable tool formed for the treatment of soles of shoes, means for shifting the tool laterally and for automatically varying its contact longitudinally of its engaging edge, a table for the work and means for maintaining engagement of the table and tool with the work, in combination with means for positively feeding the table.

27. In a machine of the character described, a pivotally mounted tool, means acting on the tool to move it about its pivot yieldingly toward the work, a pivotally mounted guard for said tool, and instrumentalities whereby the tool and guard are simultaneously shifted on their pivots out of engagement with the work.

28. A sole indenting machine, having, in combination, an indenting wheel, and means for rocking the wheel axially back and forth while in engagement with the work.

29. A sole indenting machine, having, in combination, an indenting wheel mounted to be rotated by the engagement of the work therewith and means tending to rotate the wheel in a direction to feed the work.

30. A sole indenting machine, having, in combination, an indenting tool, means for holding the tool in engagement with the work and means for rocking the tool while so held back and forth longitudinally of its indenting edge.

31. A sole indenting machine, having, in combination, an indenting wheel mounted to be rotated by the engagement of the work therewith and rotating friction driving mechanism for the wheel tending to rotate the wheel in a direction to feed the work.

32. A sole indenting machine, having, in combination, an indenting wheel, mechanism tending to move the wheel bodily in a circular path, and means for holding the wheel in engagement with the work whereby the wheel is caused to roll back and forth over the work.

33. A sole indenting machine, having, in combination, an indenting wheel, means for supporting the wheel including a spindle, a rotating sleeve in which the spindle is eccentrically mounted, and means for holding the indenting wheel in contact with the work whereby the rotation of the sleeve causes the indenting wheel to roll back and forth over the work.

34. A sole indenting machine, having, in combination, an indenting wheel mounted to be rotated by the engagement of the work therewith, driving mechanism for the wheel tending to rotate the wheel in a direction to feed the work, means for shifting the wheel into and out of engagement with the work, and means for stopping the rotation of the wheel when the wheel is shifted away from the work.

35. A sole indenting machine, having, in combination, an indenting wheel, means for supporting the wheel including a spindle, a rotating sleeve in which the spindle is eccentrically mounted, means for supporting the sleeve arranged to permit movement thereof to maintain the wheel in engagement with the work and means for holding the wheel in engagement with the work whereby the rotation of the sleeve causes the wheel to roll back and forth over the work.

36. A sole indenting machine, having, in combination, an indenting wheel, means for supporting the wheel including a spindle, a rotating sleeve in which the spindle is eccentrically mounted, a pivotally mounted support for the sleeve, and means acting on the support to maintain the wheel in engagement with the work whereby the rotation of the sleeve rolls the wheel back and forth over the work and rocks the wheel axially.

In testimony whereof I affix my signature in presence of two witnesses.

LOUIS W. G. FLYNT.

Witnesses:
FRED C. PATRICK,
QUENTIN W. BOOTH.

Copies of this patent may be obtained for five cents each, by addressing the "Commissioner of Patents, Washington, D. C."

It is hereby certified that in Letters Patent No. 1,030,576, granted June 25, 1912, upon the application of Louis W. G. Flynt, of Rochester, New York, for an improvement in "Eccentric Wheelers," errors appear in the printed specification requiring correction as follows: Page 2, line 13, for the abbreviation and numeral "Fig. 2" read *Fig. 1;* same page, line 14, for the abbreviation and numeral "Fig. 1" read *Fig. 2;* and that the said Letters Patent should be read with these corrections therein that the same may conform to the record of the case in the Patent Office.

Signed and sealed this 6th day of August, A. D., 1912.

[SEAL.]

C. C. BILLINGS,

*Acting Commissioner of Patents.*